Patented Nov. 12, 1940

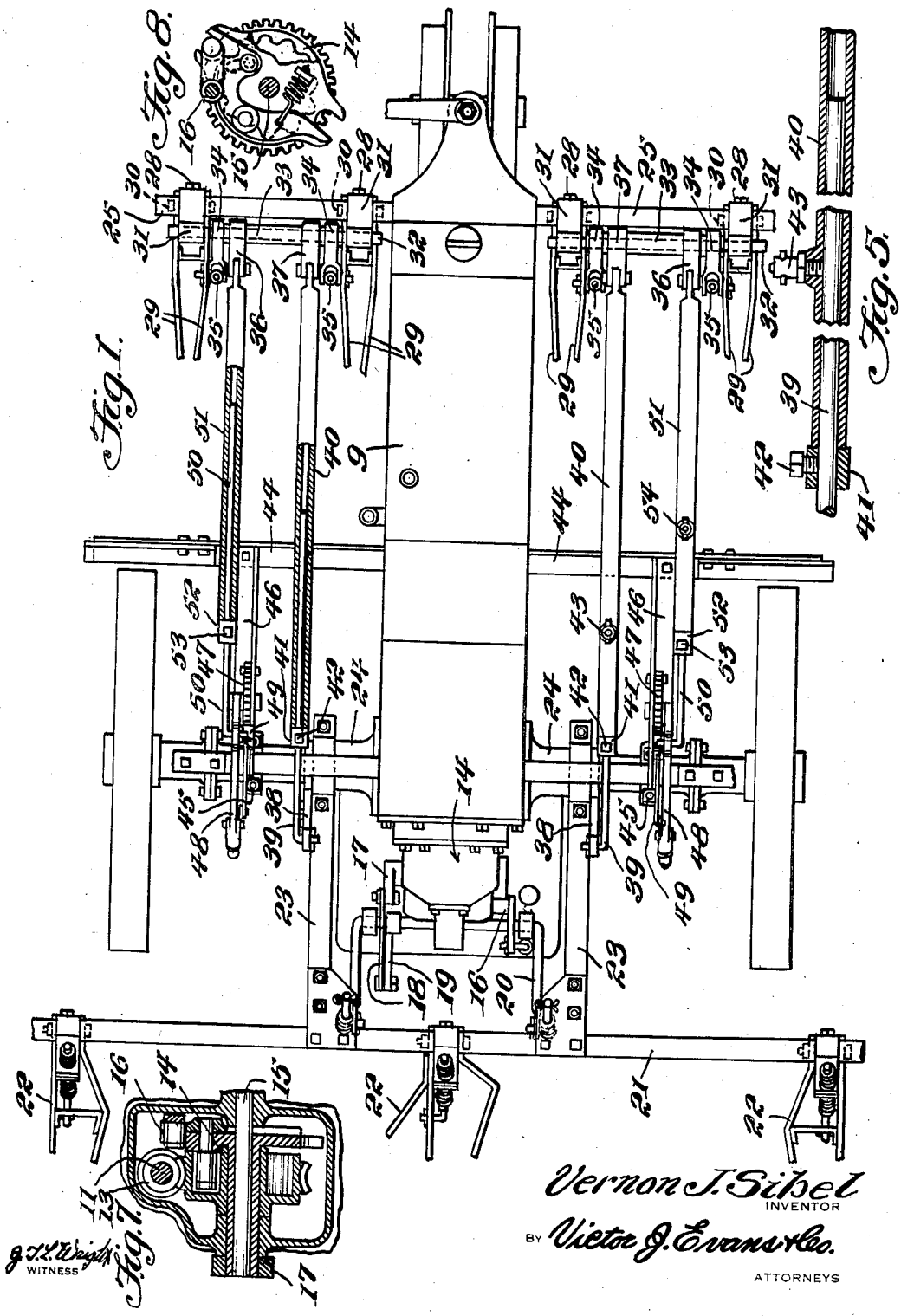

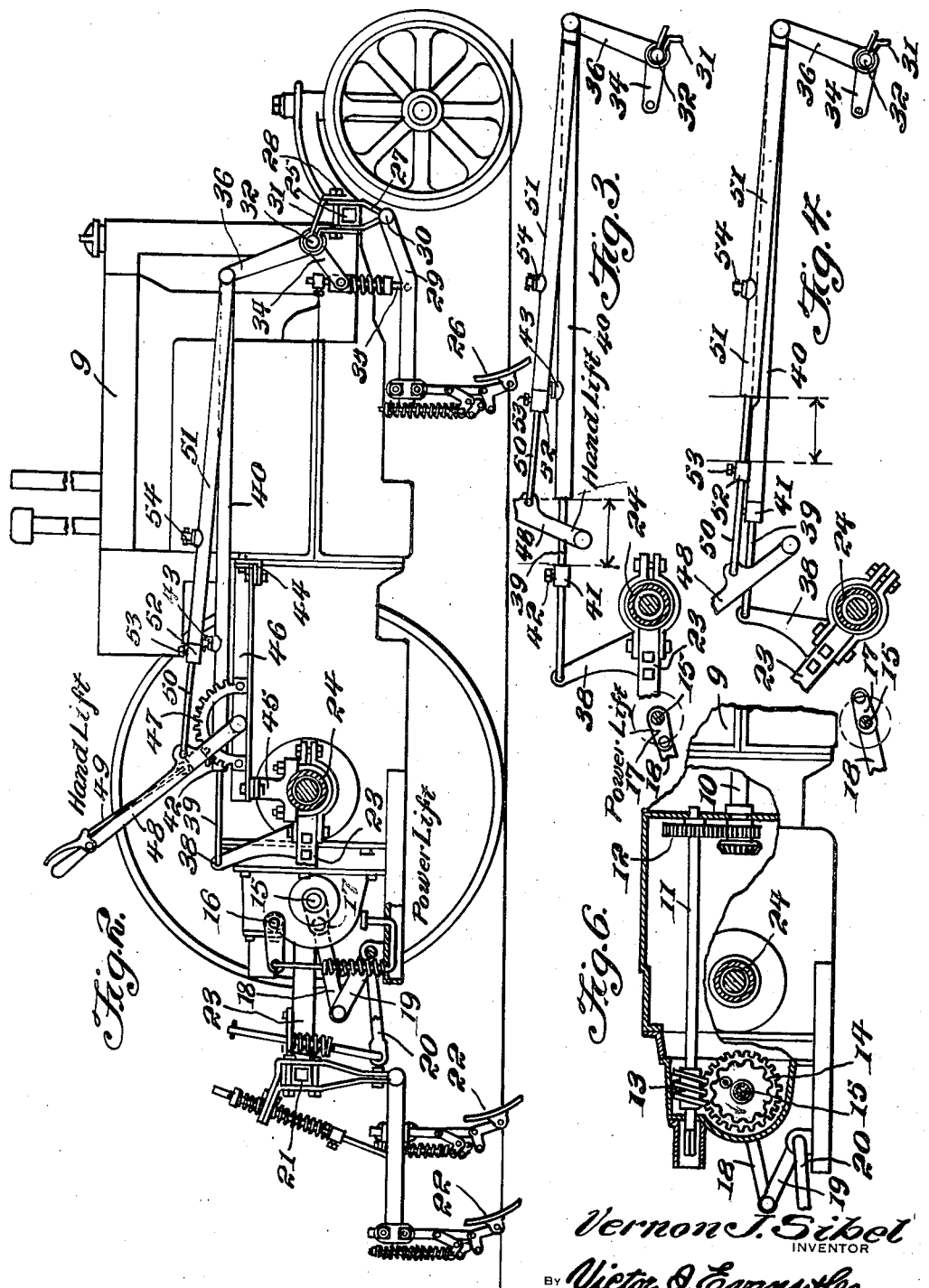

2,221,332

UNITED STATES PATENT OFFICE 2,221,332

CULTIVATOR

Vernon J. Sibel, Iowa City, Iowa

Application January 16, 1940, Serial No. 314,143

3 Claims. (Cl. 97—50)

This invention relates to cultivators, more particularly to tractor cultivators, and has for an object to provide an arrangement of telescoping rods controlled by two hand levers at either side of the tractor whereby either of the two cultivator gangs at the front of the tractor may be raised independently of the other, and independently of the power lifting means, so that the cultivator gang on one side may be lifted when one row only is to be cultivated, and also so that cultivation may be performed at any desired depth, and cultivation on hillsides will be more easily performed.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a plan view of a tractor cultivator equipped with means for controlling the cultivator gangs, constructed in accordance with the invention.

Figure 2 is a longitudinal sectional view of the cultivator shown in Figure 1, with parts in elevation.

Figure 3 is a side elevation of the means for manually controlling the gangs in one position.

Figure 4 is a side elevation of the controlling means in another position.

Figure 5 is a longitudinal sectional view of one of the telescoping rods, showing the stop collar and the oiling device.

Figure 6 is a detail side elevation showing the cultivator power lifting means.

Figure 7 is a detail cross sectional view of the conventional power lift transmisison.

Figure 8 is a longitudinal sectional view of the power of transmission shown in Figure 7.

Referring now to the drawings in which like characters of reference designate similar parts in the various views, 9 designates an ordinary tractor cultivator in which the engine shaft 10 drives a power take-off shaft 11 through a gear train 12. The power take-off shaft is provided with a worm 13 which operates the conventional power lift or motor lift clutch 14, as it is sometimes called, as shown in Figure 8. In this type of the clutch the driven shaft 15, shown best in Figure 8 is confined to one-half revolution each time the conventional trip 16, shown best in Figure 2, is tripped by the operator's heel. The shaft 15 is provided with a crank arm 17 which is connected to a link 18 the free end of which is connected to a crank arm 19 which is connected to the cross member of a yoke 20, best shown in Figure 1. The ends of the yoke are connected to a cross bar 21 which carries three cultivator gangs 22 widely spaced. The bar 21 is secured to the rear ends of spaced bars 23, the front ends of which are pivotally secured to the rear axle housing 24.

The conventional tool bar 25 which extends transversely across the front of the tractor 9, supports four front cultivator gangs 26, two on each side, disposed close to the side of the tractor. To accomplish this the tool bar is equipped with brackets 27, best shown in Figure 21, for the respective gangs, each bracket being bolted as shown at 28. The beam 29 of a respective gang is pivoted to the lower end of the bracket as shown at 30, in Figure 2.

In carrying out the invention, brackets 31 are secured to the tool bar by the bolts 28. Each pair of the brackets 31 on the same side of the tractor fixedly supports the ends of a transversely disposed shaft 32. A sleeve 33 is rotatably mounted on each respective shaft 31 and is provided with a pair of crank arms 34 which extend downwardly and rearwardly and are connected to the beam 29 of a respective gang by a conventional spring controlled lift rod 35.

Each sleeve also is equipped with a pair of crank arms 36 and 37 which extend upwardly and rearwardly from the sleeve, as best shown in Figure 2. These crank arms control the position of the front gangs as will now be described. The pivotally mounted bars 23 at the rear of the tractor, beforementioned, are equipped with respective crank arms 38 which extend upwardly and rearwardly, as best shown in Figure 2. Longitudinally extending rods 39 are pivotally secured to these crank arms, and these rods are telescopically received in tubular rods 40, as best shown in Figure 1. The front ends of the tubular rods are pivotally connected to the crank arms 37 carried by the sleeves 33. As shown in Figure 5, each rod 39 is equipped with a collar 41 which may be adjusted longitudinally of the rod by a set screw 42. The further back the collar is set the deeper the respective front cultivator gang penetrates the ground. An oil cup 43 is mounted on the tubular rod 40. The parts just described are power operated to control the position of the gangs.

For manually lifting the front cultivator gangs, selectively, as best shown in Figures 1 and 2, a transversely disposed bar 44 is secured to the tractor 9 in front of the rear wheels. The rear axle housing 24 is provided with upstanding brackets 45. Secured at the ends to the brackets 45 and cross bar 44 are longitudinally extending arms 46 which support respective racks 47 and manually operatable levers 48 having conventional locking dogs 49. A rod 50 is connected at the rear end to each lever and is telescopically received in a tubular rod 51. The front ends of the tubular rods are pivotally secured to the beforementioned crank arms 36 carried by the sleeves. The rods 50 are equipped with collars 52, similar to the beforementioned collars 41, adjustably secured on the rods 50 by set screws 53. Likewise the tubular rods 51 are equipped with grease cups 54.

Figure 2 shows the normal position of the parts when all of the cultivator gangs are lowered. To manually raise the front gangs independently of the rear ones, as best shown in Figure 3, either of the levers 48, or both, may be rocked forwardly with the result that the collar 52 is moved into engagement with the tubular rod 51, and shoves the latter forwardly to rock the lever 36 which turns the sleeve 33 which rocks the crank arm 34 and raises the respective gang. While this is taking place the tubular rods 40 of the power means for controlling the front gangs, slides on the rods 39 away from the collars 41 so that the position of the gangs at the rear of the tractor is not changed.

The operation of the power lift when all of the gangs are lowered, as shown in Figure 2, will now be explained. The power lift arm 17, shown in Figure 3, makes one-half revolution each time the power lift, or motor clutch lift 14, is tripped by the trip 16 to raise the rear gangs 22. This operation pushes the crank arms 38 forward, as shown in Figure 4, and the rods 39 are shoved forward to engage the collars 41 with the tubular rods 40 and shove the tubular rods 40 to move the crank arms 36 to rock the sleeve 33 and crank arm 34 and raise the front gangs. While this is taking place the tubular rods 51 slide on the rods 50, which are connected to the levers 49, away from the collars 52, so that the manual control is not effected.

From the above it will be seen that the operator may raise either set of front cultivator gangs independently of the other set. One of the purposes of this is to manipulate the front gangs so as not to strike plants which would be otherwise uprooted because the front gangs, of course, will set closer to the plants than the rear gangs.

From the above description it is thought that the construction and operation of the invenion will be fully understood without further explanation.

What is claimed is:

1. The combination with a tractor having rear cultivator gangs, front cultivator gangs and a manually tripped power lift means connected to the rear gangs, of rear crank arms connected to the rear gangs, front crank arms connected to the front gangs, rods connected to the rear crank arms, collars on the rods, tubular rods telescopically receiving the first-named rods, and connected to the front crank arms, the collars being adapted to engage and move the tubular rods endwise when the power lift means is actuated to lift the front gangs simultaneously with the rear gangs, and means for lifting the front gangs selectively and independently of the rear gangs including tubular rods connected to the front crank arms, rods telescopically received in the tubular rods, collars on the last-named rods, and manually controlled levers connected to the last-named rods adapted to engage the collars with the tubular rods to move the tubular rods endwise and lift the front gangs while the tubular rods associated with the rear gangs are moved endwise by the front crank arms away from their respective collars so that the rear gangs are unaffected.

2. The combination with a tractor having rear cultivator gangs, front cultivator gangs and a manually tripped power lift means connected to the rear gangs, of rear crank arms connected to the rear gangs, rods extending transversely of the front of the tractor, sleeves rotatably mounted on the rods, downwardly and rearwardly extending crank arms on the sleeves connected to the front gangs, upwardly and rearwardly extending front crank arms connected to the sleeves, rods connected to the rear crank arms, collars on the rods, tubular rods telescopically receiving the first-named rods, and connected to the front crank arms, the collars being adapted to engage and move the tubular rods endwise when the power lift means is actuated to lift the front gangs simultaneously with the rear gangs, and means for lifting the front gangs selectively and independently of the rear gangs including tubular rods connected to the front crank arms, rods telescopically received in the tubular rods, collars on the last-named rods, and manually controlled levers connected to the last-named rods adapted to engage the collars with the tubular rods to move the tubular rods endwise and lift the front gangs while the tubular rods associated with the rear gangs are moved endwise by the front crank arms away from their respective collars so that the rear gangs are unaffected.

3. The combination with a tractor having rear cultivator gangs, front cultivator gangs and a manually tripped power lift means connected to the rear gangs, of rear crank arms connected to the rear gangs, front crank arms connected to the front gangs, rods connected to the rear crank arms, collars on the rods, tubular rods telescopically receiving the first-named rods, and connected to the front crank arms, the collars being adapted to engage and move the tubular rods endwise when the power lift means is actuated to lift the front gangs simultaneously with the rear gangs, and means for lifting the front gangs selectively and independently of the rear gangs including tubular rods connected to the front crank arms, rods telescopically received in the tubular rods, collars on the last-named rods, manually controlled levers connected to the last-named rods adapted to engage the collars with the tubular rods to move the tubular rods endwise and lift the front gangs while the tubular rods associated with the rear gangs are moved endwise by the front crank arms away from their respective collars so that the rear gangs are unaffected, and means for locking the levers in forwardly rocked position to hold the front gangs raised and in rearwardly rocked released position.

VERNON J. SIBEL.